(12) United States Patent
Emmelmann et al.

(10) Patent No.: US 9,286,324 B2
(45) Date of Patent: Mar. 15, 2016

(54) METHOD FOR OPERATING A GEOLOCATION DATABASE AND A GEOLOCATION DATABASE SYSTEM

(75) Inventors: Marc Emmelmann, Berlin (DE); Bernd Bochow, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 419 days.

(21) Appl. No.: 13/991,696

(22) PCT Filed: Dec. 6, 2011

(86) PCT No.: PCT/EP2011/006349
§ 371 (c)(1),
(2), (4) Date: Sep. 5, 2013

(87) PCT Pub. No.: WO2012/076192
PCT Pub. Date: Jun. 14, 2012

(65) Prior Publication Data
US 2013/0339353 A1 Dec. 19, 2013

(30) Foreign Application Priority Data
Dec. 6, 2010 (DE) .................. 10 2010 053 555

(51) Int. Cl.
*G06F 17/30* (2006.01)
*H04W 16/14* (2009.01)
*H04W 72/06* (2009.01)
*H04W 24/10* (2009.01)

(52) U.S. Cl.
CPC ......... *G06F 17/30241* (2013.01); *H04W 16/14* (2013.01); *H04W 24/10* (2013.01); *H04W 72/06* (2013.01)

(58) Field of Classification Search
CPC ..... H04W 16/14; H04W 64/00; H04W 72/10; H04W 72/06; H04W 84/18; H04B 17/26; G01H 3/08; G01H 3/10; G01J 3/32; H01J 49/26; H04L 5/0096; H04L 5/0005; G06F 17/30241
See application file for complete search history.

(56) References Cited

U.S. PATENT DOCUMENTS

| 8,928,759 | B2 * | 1/2015 | Li | ............... | H04W 16/14 348/180 |
|---|---|---|---|---|---|
| 2008/0076450 | A1 | 3/2008 | Nanda et al. | | |
| 2010/0069013 | A1 | 3/2010 | Chaudhri et al. | | |
| 2010/0330919 | A1 | 12/2010 | Gurney et al. | | |
| 2011/0228666 | A1 * | 9/2011 | Barbieri | ............... | H04W 76/023 370/216 |
| 2011/0319129 | A1 * | 12/2011 | Bhat | ............... | H04W 72/02 455/552.1 |
| 2014/0051467 | A1 * | 2/2014 | Tan | ............... | H04W 16/14 455/501 |

FOREIGN PATENT DOCUMENTS

WO    2008039872 A2    4/2008

* cited by examiner

*Primary Examiner* — Nizar Sivji
(74) *Attorney, Agent, or Firm* — The Webb Law Firm

(57) ABSTRACT

A method and a system for the operation of a geolocation database comprising a spatiotemporal spectrum map comprising of white space spectrum occupancy and/or white space spectrum underutilization data, wherein a) at least one white space spectrum sensor takes measurement data remote from the geolocation database; b) the measurement data are transmitted to the geolocation database; c) the spatio-temporal spectrum map and/or its parameters and/or decisions based on this spectrum map are modified in dependence of the measurements received by the geolocation database.

20 Claims, 2 Drawing Sheets

METHOD FOR OPERATING A GEOLOCATION DATABASE AND A GEOLOCATION DATABASE SYSTEM

BACKGROUND OF THE INVENTION

1. Field of the Invention

The invention relates to a method for operating a geolocation database and to a geolocation database system.

2. Description of Related Art

The future usage of radio frequencies will encompass so called white spaces, e.g., regions in the frequency range from 110 MHz to 790 MHz for TV white space. Those white spaces are geographical regions in which licensed frequency bands may be used by license-exempt users, given the latter are certified and do not harm licensed users (opportunistic operation). A licensed user is also termed as an incumbent spectrum user—a spectrum user (usually a wireless communication system) that is licensed and certified by an authority, and is authorized to use a specified (e.g., allotted) frequency spectrum as a priority user. White spaces can have a temporal restriction, too.

For such usage, legislative regulation envisions—e.g., privately operated—databases (geolocation databases) which store (e.g., EU-wide) position data and transmission characteristics of known radio masts (or other devices which need protection from interferences), and which assume, based on radio propagation models, if signals of licensed users propagate to a given location at which, in consequence, interference-free reception has to be guaranteed.

When a license-exempt user wishes to transmit "in the white space", it has to register with the geolocation database, providing his position and in particular the spectrum usage characteristics (e.g., if it is a fixed stationary or a mobile device), in order to obtain a permission (or having the permission denied).

For this decision process a terrain model and a radio propagation model estimating the radio environment at the position of the license-exempt user are used in order to determine the region where the non-licensed user might act (from the perspective of the incumbent user) as an interferer.

Only if no interference is expected, permission for transmission is granted to the license-exempt user.

As it is impossible to characterize the radio propagation and the associated interference with 100% accuracy for a given point in time and space (i.e., the spatial-temporal location), this decision process employs approximation models.

In addition to the up-to-dateness of the database, this accuracy impacts the decision if a license-exempt or non-licensed user obtains a permission to transmit.

It can be assumed that the terrain and radio propagation models used for protecting the incumbent users approximate the interference and deny license-exempt users the transmission in a way that a considerable part of white space resources is not used optimally. Depending on the business model for assigning and distributing usage rights of white spaces by license-exempt users, such sub-optimal usage results in financial losses.

Apart from the mentioned causes for the limited accuracy of the database approach, current means of using the database are generally not applicable for mobile frequency users—according to the current state of the art, such users had to re-register approximately every 60 seconds according to local regulations.

The worldwide introduction of geolocation databases as described above is planned in the form of distributed regional databases. Accordingly, improvements of this structure will be introduced by adding functionality via external components not changing the existing, internal architecture. The described embodiments are in principle independent of the internal structure of the geolocation database, as long as the known interfaces provide the functionality as described below.

SUMMARY OF THE INVENTION

The goal of the proposed solution is to assure the protection of registered, incumbent users while maximizing the usage of white space (in space and/or time).

This problem is solved by a method for enhancing the operation of a geolocation database for spectrum white.

The geolocation database operation method comprises
a) a geolocation database which contains a spatio-temporal spectrum map comprising spectrum occupancy and/or spectrum underutilization (white space) data
b) at least one white space spectrum sensor taking measurement data remote from the geolocation database,
c) transmission of the measurement data to the geolocation database,
d) modification of the spatio-temporal spectrum map and/or its parameters and/or decisions based on this spectrum map in dependence of the measurement data received by the geolocation database.

The at least one white space spectrum sensor provides the capability to take measurements, which are then fed beck to the geolocation database.

In one embodiment of the invention the at least one white space spectrum sensor is coupled to at least one white space device.

It is possible that a white space device is coupled to more than one white space spectrum sensor. If the white space spectrum sensors are spatially distributed this can enhance the accuracy of the measurements.

And in another embodiment the at least one white space spectrum sensor and/or the at least one white space device are movable devices, in particular handheld devices. This implies that not all of the white space devices and/or white space spectrum sensors are moveable, some might be stationary.

Further embodiments of the invention are subject of the subclaims.

The invention allows in particular:
1) Enhancement of a state-of-the-art geolocation database for increased accuracy of spectrum availability decisions.
2) Enhanced operation of a state-of-the-art geolocation database by sharing data between database and external decision logic allowing enhancement of internal radio propagation models of the database by external spectrum sensing, and
3) Validation and verification of geolocation database decisions by external spectrum utilization measurements (including aspects from 1) and 2)).

A coupling of the at least one white space device to at least one white space spectrum sensor assures that spectrum measurements from the sensor have a well-defined spatial-temporal relation to an eminent request of the at least one white space device to use the white space. Additionally, measurements from at least one sensor not coupled to a white space device may be considered for a general assessment of the availability of white spaces at the at least one sensor's current location; such assessment being independent from the eminent request of a white space device to use the white space. The data of coupling sensor measurements with the eminent intention of a white space device to communicate in the white space implies additional context that may be used by advanced algorithms modifying the spatio-temporal spectrum map and/or its parameters and/or decisions of the geolocation data base.

The white space device provides means for communication within the white spaces. For such, it reports at least its position, intended transmit power, and its kinds (i.e. what kind of modulation, media access scheme, or mobility) to the data base. A tight coupling (special collocation) of a white space device with a sensor allows to provide sensing data at exact the same location as the white space device. Especially, sensor and white space device may share in such a case the same antenna and/or transceiver chain. Such tight coupling might be required in certain regulatory domains.

BRIEF DESCRIPTION OF THE DRAWINGS

Embodiments of the invention are described in the following figures in which.

DETAILED DESCRIPTION OF THE INVENTION

Figure 1:
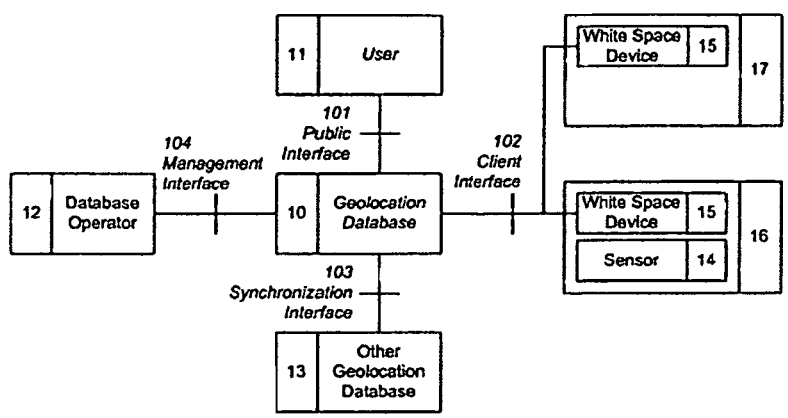
FIG. 1 shows a known method of operating a geolocation databases for white space applications.
Figure 2:
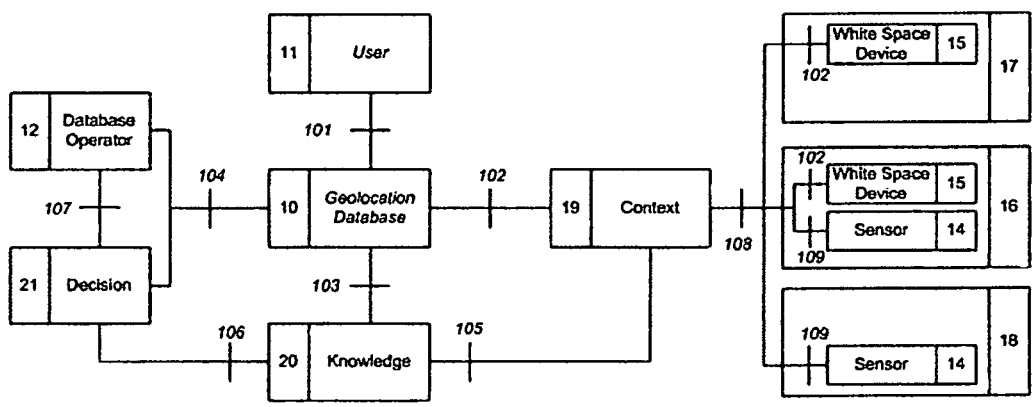
FIG. 2 shows an embodiment of the method and system according to the invention.

FIG. 1 describes required functionality and interfaces of the envisioned geolocation database according to the state of the art. FIG. 2 describes an embodiment of an enhanced method and system according to the invention, in which a white space device 15 is coupled to a white space spectrum sensor 14.

Accessing a geolocation database 10 occurs via four interfaces: a public interface 101, a client interface 201, a synchronization interface 103, and a management interface 104.

The public interface 101 grants read-only access to users 11 to the data within the geolocation database 10 in order to determine, for example, if a white space frequency can be used at a given location queried for. The user 11 is a human user or an agent/machine requesting data about current usage of white spaces for a certain geographic location.

For the state-of-the-art usage and/or operation of the method and the system, a white space device 15 may be coupled with a white space spectrum sensor 14. The white space spectrum sensor 14 gathers spectrum data about the current spatial position of the white space device 15 that is used for fast back-off. The white space spectrum sensor 14 detects and/or measures, e.g., the existence of primary users and/or, the power of transmission in channels.

In addition to the white space spectrum sensor 14, other kinds of sensors can be used. Examples for such additional sensors include but are not limited to: proximity sensors detecting the existence of other nearby white space devices; or motion sensors that may allow to track the movement/trajectory of a white space device. Also, the white space spectrum sensor 14 (or the alternative sensors as mentioned before) may be substituted by any kind of data source providing equivalent context.

As indicated in FIG. 2, the white space device 15 can be integrated with a white space spectrum sensor 14 in one physical device, i.e., a first unit 16. One example for this is a mobile phone with detect-and-avoid capability. But it is also possible that the white space device 15 and the white space spectrum sensor 14 are separated (and potentially spatially separated) units 17, 18 but their data is jointly evaluated to provide data to the geolocation database 10.

FIG. 2 shows three different units 16, 17, 18, which can be used to establish the coupling. In the first unit 16 a white space device 15 forms an integral unit with the sensor 14.

For the state-of-the-art usage and/or operation, every white space device 15 of a license exempt user, has to register itself at the database and has to be granted permission for its operation.

The white space device 15 can be coupled, in particular integrated, with a wireless communication device, such as a mobile phone, intended to operate as a secondary spectrum user in spectrum white space, capable to register its capabilities and characteristics of spectrum access (i.e., method and parameters) with the geolocation database 10.

Herein, a secondary spectrum user is understood as a spectrum user that is using frequency spectrum either license-exempt (e.g. opportunistic) or as the owner of temporary spectrum usage rights obtained from an authority, being obliged to create no interference to incumbent spectrum users.

A white space device 15 can be, e.g., a single wireless communication device (such as a mobile terminal), an environmental sensor (such as a smart grid sensor in machine-to-machine communications, i.e., this is not a white space spectrum sensor 14), or a (mobile) network comprising multiple single devices (such as an ad-hoc network) that operates in a certain frequency band, within a certain geographical area and at a certain time known as not actively utilized currently by its incumbent spectrum user. A further well-known implementation is that of a TV white space device operating on a vacant broadcasting channel.

Current approaches do not consider utilization of spectrum sensing or spectrum measurements of white space utilization in their vicinity along with feeding back or integrating sensed data with the database. Hence, the communication with the geolocation database 10 occurs only via the client interface 102 which allows the exchange of data between the white space device 15 (respectively its embodiments) and the geolocation database 10.

The synchronization between several databases 10, 13 occurs via the synchronization interface 103. Examples for such other databases 13 are distributed copies of the same database of one single operator (e.g., allowing for load-balancing requests to the database) or a "master database" maintained by, e.g. a regulator.

A database operator 12 has access to the geolocation database 10 via its management interface 104 in order to modify or incorporate, for example, additional data. The database operator 12 could be a spectrum regulations authority or some other entity authorized to operate a geolocation database 10. The database operator 12 may be an organization, a person, or some software application. Since this entity may be legally responsible for proper and dependable operation of the geolocation database 10, it has to authorize any modifying access to the geolocation database 10, and further may be the only entity that is allowed to access the geolocation database 10 via its management interfaces.

An embodiment of the invention (see FIG. 2) builds upon the existing interfaces to the geolocation database 10 and adds additional functionality incorporated by external functional units, without changing any of the interfaces 101, 102, 103, 104 to the geolocation database 10 or imposing any demands for changing the internal functionality of a geolocation database 10.

Additional functionality is added via the following units and their interfaces: a context unit 19, a clientSensing interface 108, a contextKnowledge interface 105, a knowledge unit 20, a knowledgeDecision interface 106, a decision unit 21, and a databaseOperatorDecision interface 107. The context unit 19, the knowledge unit 20 and the decision unit 21 are described in the following.

The context unit 19 is a client to white space spectrum sensors 14 responsible for evaluating spectrum measurements from a multitude of white space spectrum sensors 14. In the simplest case the received signal power measurements obtained from sensors are taken and extrapolated in a suitable way between sensor positions and acquisition times to estimate the RF field strength in [dBm] throughout a certain geographical area and period of time (space-time). The context unit is a computing unit applying more or less sophisticated algorithms to filter redundancy and irrelevant data, and to increase accuracy and dependability of joint measurements by, for example, detecting discontinuities in the spatial domain (e.g., a switch between in-door and out-door environment), detecting outliers, or detecting time-varying spectrum user activity or RF environment characteristics (e.g., caused by changing environmental conditions) that must be considered for the radio scene, in particular the radio environment model.

The knowledge unit 20 is a computing entity that can generate facts from observations and can infer from facts. One or more reasoning engines usually realize this; a multitude of realization methods is available from the field of artificial intelligence (such as case-based reasoning or neural networks). The main purpose of the knowledge unit 20 is to relate current context provided by the context unit 19 (e.g., a spatio-temporal spectrum utilization map acquired from a short-time measurement on a limited geographical area) with knowledge from earlier observations such as the history data of activity of an incumbent spectrum user. This knowledge may include data from at least one geolocation database 10 if suitable. The data provided by the knowledge unit 20 ideally has the same format and comparable data as can be obtained from the geolocation database 10 by a user 11 or by other geolocation databases 13. Given that this data can be directly compared to each other, the difference between spectrum utilization as assumed by the geolocation database 10 (utilizing its internal decision and modeling methods) and as observed white space devices 15 and forwarded/evaluated by the units 19, 20 constitutes the difference between measurement (including measurement errors) and model (including propagation and terrain model), which can be utilized for various purposes as outlined by this invention.

As mentioned above, the white space devices 15 which are coupled with a white space spectrum sensor 14 gather "on location" measurement data. This data is used to obtain an augmented context (together with data from the geolocation database 10 and/or other sensing equipment) which is then processed by the knowledge unit 20. In the simplest case this comprises the comparison of location measurement data and data from the geolocation database creating an augmented context. The embodiment described in FIG. 2 shows a white space device 15 which is coupled with at least one white space spectrum sensor 14. In general this coupling is not required. In further embodiment, the at least one white space spectrum sensor 14, preferably a plurality of white space spectrum sensors 14, gathers measurement data that is then transmitted to the geolocation database 10 for further processing.

The decision unit 21 is a computing entity which may (partly) rely on cognitive functions having the generation of recommendations to the database operator 12 as its main objective. If suitable, the decision unit 21 may directly take actions that affect the internal methods of the geolocation database 10 (e.g., its methods or models). Its functionality gains from the capacity of the operator's interface to the database 104, and can depend in its efficiency or impact on the capacity of the internal implementation of the geolocation database 10, which in turn depends on applicable regulatory requirements. If available, the decision unit 21 may apply changes directly to certain parameters that relate with the 2D propagation model or with the 3D terrain model in use, which may include terrain elevation and buildings besides the position of incumbent transmitters such as broadcasting stations. Usually, these models shall be authorized and must not be changed easily. In this case (human) interaction with the database operator 12 might be required and actions taken by the decision unit 21 must be authorized as well.

A white space spectrum sensor 14 is a receiving device for radio signals capable to receive an RF signal, determine at least its signal strength (e.g., in [dBm]), and to communicate this measurement value along with the duration of measurement, the timestamp and position when the measurement was taken, the assumed accuracy of the measurement, and its measurement device capabilities (e.g., an electronic datasheet) to its client. In case a narrowband sensor must obtain measurements from a wider frequency band, the measurement bandwidth, the number of consecutive frequency increments and the overlap of single measurements in frequency and time may be required in addition. A smart sensor (i.e. having computing capacity) may already pre-process these measurements to generate a complex measurement result such as a spectral power envelope.

The context unit 19 operates in the communication path between the geolocation database 10 and the white space devices 15, and may monitor or participate in the data exchange between white space device 15 and geolocation database 10. The white space devices 15 can be packaged in different units 16, 17 as will be described below. The context unit 19 communicates with the geolocation database 10 via the client interface 102.

An extended ClientSensing interface 108 is provided to the different of white space devices 15. Such an extended interface does at least comprise the capabilities of the client interface 102 and of a sensing interface (109). The clientSensing interface 108 is backward-compatible to the client interface 102 such that—from the view of a unit 16, 17 with a white space device 15—there is no noticeable difference if the unit 16, 17 and/or the white space device 15 communicates directly with a geolocation database 10, as in the state of the art depicted in FIG. 1 or exchanges the same data with a context unit 19, as depicted in FIG. 2.

In case of communication with the context unit 19, the latter relays requests from the white space device 15 to the geolocation database 10. The same applies to corresponding responses from the geolocation database 10 to the white space device 15. This approach opens the opportunity to determine within the context unit 19 the context of such requests/responses. At least, such context contains the request itself, including the associated location of the requesting white space device 15, the kind and/or class of the white space device, and the frequency assignment. The response from the geolocation database 10 contains at least the permission or denial for the requested white space usage by the white space device 15.

In addition to existing approaches, the context unit 19 may extend the context by adding additional data. It may for example collect additional measurements, i.e., the location of the point where measurements are taken, the current interference or burst emission power, or measured mobility profiles of users. It may therefore use, for example, external white space spectrum sensors 14 which may either be incorporated in the same first unit 16 as the white space device 15, or are decoupled as a separate third unit 18.

All white space spectrum sensors 14 and/or white space devices 15 communicate with the context unit 19 via the clientSensing interface 108. In addition to the pure functionality of the client interface 102, it encompasses at least the additional functionality of the sensing interface 109.

This combination provides full backward-compatibility to the state-of-the-art (as shown in FIG. 1) while allowing a second unit 17 with a single white space devices 15, a third unit 18 with a single white space spectrum sensor 14, or a first unit 16 with a combined white space spectrum sensor 14 and white space device 15 to communicate with the context unit 19 via the same interface.

Within the units 16, 17, 18, the clientSensing interface 108 has to be divided into its functional parts in order to establish a connection with a white space device 15 (see connection 102) in the second unit 17 and the first unit 16 via a client interface; or with the white space spectrum sensors 14 (see connection 109 in the first and third units 16, 18) via the (for the unit internal) sensing interface 109 (distributed sensing embodiment).

As part of the context aggregation process utilizing location data, the context unit 19 can also combine requests for using the white space as received from white space devices alone in the second unit 17 with measurements received from a third unit 18 with a single white space spectrum sensor 14.

The same applies for requests and/or measurements received from first units 16 of combined white space devices 15 and white space spectrum sensors 14.

The context unit 19 communicates with the knowledge unit 20 via the contextKnowledge interface 105 in order to convey the collected context data from context unit 19 to knowledge unit 20.

The context unit 19 provides functionality for context filtering and evaluation of the relevance of data received from unit 18, 17, 16. As part of this evaluation, the context unit 19 may, for example, forward data obtained from the geolocation database 10 extended by additional measurements, with the. The knowledge unit 20 may therefore use a (partial) copy of the data stored in the geolocation database 10. In addition, the knowledge unit 20 may, for example, obtain such a copy from the geolocation database 10 via a synchronization interface 103.

Context filtering and relevance evaluation result in an estimate of the probability of the correctness/accuracy of the current state of the geolocation database 10 represented by its (partial) copy residing in knowledge unit 20.

Based on dedicated a rule-set dynamically selected by a a-prior configuration or by automated reasoning to satisfy a given optimization goal, the knowledge unit 20 processes (potentially to a limited extent) and/or forwards this knowledge to the decision unit 21 via the knowledgeDecision interface 106.

For example, such a rule-set may select context data for immediate forwarding to the decision unit 21 or may select data learned from earlier experience from a suitable time frame (e.g. repeating time of day, near past or similar) for augmenting context data prior to forwarding. Such fusion of data is similar to a case-based reasoning process evaluating the knowledge available from earlier experience for similarities with the context experienced currently and for determining how the current context can be complemented to support a certain optimization goal.

The decision unit 21 processes the obtained data, having the goal to optimize the accuracy of the data stored in the geolocation database 10. It therefore utilizes a decision engine and rule-set which chooses amongst a set of available algorithms the one whose application—under the constraints of the context data and its evaluation—results in an optimal improvement of the accuracy of the geolocation database. In this optimization process, rules determine which optimization method is applied. For example, algorithms or heuristics optimizing the terrain model or optimizing propagation models may be applied.

The result is data how the geolocation database 10 (e.g., its decision rules or underlying models) should be modified. The modification of the geolocation database 10 may be directly triggered by the decision unit 21 via the management interfaces 104.

Also, there is the possibility to inform the database operator 12 via a databaseOperatorDecision interface 107 about this proposed change as a "Suggestion to modify the data stored in the database". This allows the operator 12 of the geolocation database 10 to review and permit the suggested changes and to incorporate them directly via his direct access to the geolocation database 10 via interface 104, or to provide feedback to the decision unit 21 via interface 107 granting permission to change the database.

In the following, without limiting possible alternatives, a further embodiment of the approach is described. Reference is made to FIG. 2.

The purpose of the knowledge unit 20 (to provide context filtering and estimation of the relevance of the received data in order to estimate the probability of correctness of the current state of the geolocation database 10 for a given position) may be achieved, for example, by comparing measurement results (forwarded from the context unit 19) with modeled data contained in the geolocation database 10 for the location of the sender and the registered TV white space devices, considering thresholds and safety margins per ECC Rep. 159 and models according to ITU-R P1546.

The context unit 19 receives the modeled data from the geolocation database 10 via an interface 103.

Alternatively, it is possible to obtain for each measurement—which is obtained via an interface 105 and which can, e.g., contain tuples of location, activity level of a user requiring protection (e.g., by providing a histogram of detected signal strength over the measurement time) jointly in conjunction with model-based spectrum map information—an assertion if the combination of measurement and assumption that primary user activity is given at a certain location, is a true/false positive/negative statement.

Several of such assertions—in relation to the geographical region they apply to—allow to obtain an accuracy estimation by calculation the relation of true/false positives/negatives.

Several of such assertions obtained from both measurements and database decisions in relation to the same geographical region allow obtaining accuracy estimations through observing and judging the relation of true/false positives/negatives between model-based and measurement-based decisions.

The obtained data regarding the accuracy of the geolocation database 10 is sent from the knowledge unit 20 via interface 106 to the decision unit 21.

The decision unit 21 obtains a sequence of assertions produced by the knowledge unit 20, each applying to a different point in time, and processes these assertions.

The decision unit 21 may therefore employ a rule-based decision logic. The decision logic evaluates, for example, the analysis of the accuracy as well as the trend of the received analysis.

Several classes of algorithms are available for this "learning function". Examples include Bayesian learning, reinforcement learning, as well as algorithms based on multilayer Kohonen neural networks. At the same time, "particle swarms", game-theoretic and genetic algorithms, as well as neural networks are potential candidates.

Software-based solutions as well as hardware-based solutions, e.g. memristor networks, are applicable.

As several embodiments of the geolocation database 10 are possible, different implementations/embodiments of the above described approach are feasible.

Such alternatives do not differ in terms of their offered functionality, but merely in the representation of data that is exchanged between the components depicted in FIG. 2 and in their potential benefit in relation to the data exchanged.

Possible embodiments of such interface representations include, e.g., HTTP, SOA, XML, as well as APIs.

The advantage of the proposed solution is that it embeds existing approaches in a novel concept that gradually adds intelligence to the existing solutions.

This is important for a wide acceptance of the proposed solution as errors in the database or its operation may directly yield to interference experienced by single or multiple frequency users.

Additionally, the presented approach allows a database service provider to extend his business portfolio/offered services towards specific value added services, e.g., the support of mobile frequency users as an additional service compared to the exclusive support of stationary or very slowly moving users.

As the proposed approach enables a continuous improvement of the accuracy of the database, it allows for supporting an increased number of non-licensed users.

As it is possible to ask for a monetary compensation from users of the database, it is possible to draft a realistic business case for operators of such enhanced databases, which includes obtaining licenses for the presented approach by third parties.

Future extended geolocation databases for White Space Communication utilizing higher frequencies (e.g., >1 GHz) or difficult terrain (e.g., on-campus or indoor) may then include:

Operation, optimization and layout of related services
Optimization of the models for radio propagation between primary users/stations to be protected and secondary users/temporarily registered users.
Decoupling of propagation and terrain models while determining reciprocal interference between users.

Currently, the terrain model is used in combination with the propagation model to calculate potential interferer thresholds that guarantee interference-free operation for incumbent spectrum users, in particular for receiver devices of the incumbent spectrum user. These thresholds in turn determine if a certain frequency band at a certain location can be considered a white space at a certain time.

Additional context, e.g., obtained by white space spectrum sensors 14, results in having data about interference at a given location at a given time, determined by either a dedicated interference model (potentially generic and/or specific for a certain combination of incumbent and kind of white space device), or by calculation from several measurements Such data is independent from the data calculated by combining terrain and propagation model. It hence decouples the tight relation between the two models formerly strictly required to obtain data on interference for a frequency range of interest.

With the additional context we add by our approach, new opportunities come up. E.g. one could use the terrain model in combination with our added (sensor-based) interference data in order to "fine-tune" the propagation model for a given geographical area.

Future white space applications outside the TV frequency bands, depend on the ongoing actual legal regulation process.

In the following some effects of the embodiments described above are given. The described embodiment of the invention may be used to extend an existing geolocation database 10 with cognitive and self-learning functionality. Only existing interfaces are used in this approach.

Real radio measurements are used for continuously checking the geolocation database 10 for inaccuracies, inconsistencies and errors, as well in aligning used models with reality. The geolocation database 10 contains theoretical (calculated) values based on terrain and propagation models. Those calculated values can be verified by actual measurements (as obtained by white space spectrum sensors 14). The geolocation database 10 in particular contains values of potential interferer thresholds at a given location. Such values are, e.g., calculated using terrain and radio propagation models. Most of such calculations do not account for any variation of interference over time. In contrast, white space spectrum sensors 14 coupled with white space devices 15 provide measurements representing, e.g., interference for a given location for a given point in time. Database models (i.e., terrain and radio propagation models) are changing slowly. That is, they may change whenever the database is updated. Involving white space spectrum sensors adds temporal flexibility enabling to detect potential interferers at the very same point in time when they start transmitting. This obviously is enabling detection of malusers or of defective devices within a short timeframe.

Such measurements represent the actual (e.g., real time) current interference (and not the theoretically calculated value as found in the geolocation database 10) or the pure existence of devices causing interference without quantizing the actual interference causes by each device. Both calculations and measurements, i.e., the expected interference values from the geolocation database 10 and the actual values from the white space spectrum sensors 14 are combined in the context unit 19 into an extended context. Such context is delivered to the knowledge unit 20 which can use all the data to obtain knowledge with respect to the accuracy of the database.

The simplest form of obtaining such data (knowledge) is the comparison of expected (in the geolocation database 10) values with measures (actual) values, but other complex approaches employing advanced reasoning schemes are as well possible. The knowledge about potential discrepancies is forwarded to the decision unit 21. The latter unit decides on any appropriate actions, e.g., it might decide to correct inconsistencies in the geolocation database 10. One form of such correction includes the initialization of the geolocation database 10 in case values based on theoretical propagation and terrain models were not provided. For such case, the geolocation database 10 would be initially empty (stating "no interference" at a given location or explicitly stating "no interference value available"). For such a situation the context obtained from white space spectrum sensors 14 could result in obtaining an extended context and for the first time obtaining knowledge on interference at a given location. In such a case, the decision scheme could eventually populate the geolocation database 14 with interference values based on the sensor measurements. Again, such populated values were subject to a continuous (re-)evaluation employing the described approach. Such an evaluation loop results in an increased accuracy of the spatio-temporal spectrum map contained in the geolocation database 10 or even might actually add the temporal aspect of such description if the model originally used to calculate the geolocation database values did not cope for temporal variations. The enhanced data in form of the spatio-temporal spectrum map hence includes parameters and/or measurements describing the utilization of frequency spectrum (or underutilization of spectrum) for a certain frequency range, geographical range and temporal range, thus allowing to locate geographical areas and periods of time where a certain frequency band can be used by secondary spectrum users without (or in a non-harmful way) interfering with incumbent spectrum users.

Measurements allow, in contrast to merely registering device characteristics, to consider the real actual accumulated radio emission characteristics of all users in a region. Thresholds are more realistic than a calculated summation of the emitted power of all users, hence reducing the interference probability.

The observation of the entire chain of "registration, modeling, interference evaluation, movement/mobility, de-registration" allows
a) to consider usage models within the database (e.g., to optimize database access load)
b) to develop and consider models of reciprocal interference between users Furthermore, the registration of mobile users is recognized and the effects of their movement/position change in the process of adapting their interference thresholds is considered.

The above mentioned aspects may be considered by a learning and/or cognitive algorithm which allows to optimize the operation of the database as well as to partially automate required manual management processes in order to increase their robustness and dependability.

In the following some additional aspects of embodiments are mentioned.

The synchronization between databases allows for load sharing, distributed database topologies as well as for spectrum trading.

Sensing should be allowed as means to enhance the accuracy of databases.

Direct communication between white space devices 15 coupled with white space spectrum sensors 14 (both together considered as slaves) could be allowed given that operation of each slave is allowed under the control of a master.

It should be mentioned that "slave devices" must not guarantee to be able receiving a signal to cease transmitting from a "master device". This would prohibit any "slave device" to employ power saving mechanisms and hence would have a negative impact on the market for WSDs. Nevertheless, if "slave devices" receive such a signal, they shall act correspondingly. Emphasize should be put on the requirement to cease transmission "within 5 seconds of not receiving a response from the master device to a transmission."

A shared responsibility between database providers and device manufacturers is possible. The former guaranteeing that their improvement of the database using (external) sensing data does not cause interference given that the received sensing data has a given accuracy. The latter guaranteeing that provided sensing data is accurate at a given confidence level.

Alternatively to modifying the database at the database provider by using external sensing data, we envision that sensing data could be accumulated by the database provider and fed back to a certified (master) database which would then (centrally) be improved. This would also open new business models for selling improved databases. Such business model might involve one or more certified database providers, database providers, as well as white space device 15 manufacturers receiving monetary benefits for providing sensing-equipped white space devices 15.

To support rapid deployment of databases, we envision in a first step that network operators would be responsible for the operation of these 'secondary' databases. Though, competition between entities wishing to operate such database should be enabled and encouraged. We can see that "secondary databases" may need to be approved by a certification agency. The effort required of the certification agency in approving such databases may prove to be considerable and so further discussion on this topic may be necessary.

In the following some terms are defined.

Radio scene analysis—term introduced by Haykin (2005) to summarize the methods to obtain a description of the characteristics of a radio frequency environment as experienced by an observer (e.g., by a white space spectrum sensor) and by the communication system (e.g., path loss between transmitter and receiver).

Signal parameter—a parameter describing the characteristics of a received radio signal for further classification of the spectrum user that emits the signal. Commonly used parameters are, for example, frequency, bandwidth, received signal strength, direction of reception, power spectral density, cyclostationarity parameters, or similar.

Spatio-temporal spectrum map—a parameter describing the utilization of frequency spectrum (or underutilization of spectrum) for a certain frequency range, geographical range and temporal range, thus allowing to locate geographical areas and periods of time where a certain frequency band can be used by secondary spectrum users without (or in a non-harmful way) interfering with incumbent spectrum users. Generating a spectrum map is a complex task and requires multiple measurements over time, position, and frequency, usually utilizing sensors of much higher sensitivity and accuracy than the receivers of the incumbent spectrum users (victim devices) to obtain data about interference situations.

Spectrum sensing—the process of observing frequency spectrum by means of (distributed) white space spectrum sensors (radio frequency measurements), evaluation of measured values with respect to their characteristics (analysis) and identification of spectrum users (classification) based on measurements taken. (e.g., IEEE, 2011)

(Haykin, 2005) Haykin, S., *Cognitive radio: brain-empowered wireless communications,* IEEE Journal on Selected Areas in Communications, 2005.

(IEEE, 2011) IEEE Std 1900.6-2011, *IEEE Standard for Spectrum Sensing Interfaces and Data Structures for Dynamic Spectrum Access and other Advanced Radio Communication Systems,* April 2011.

Figure 3:
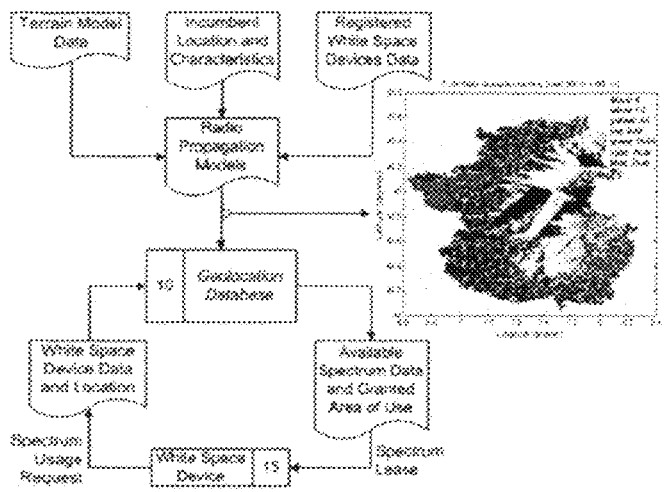
FIG. 3 shows the data flow through a known geolocation database.

FIG. 3 describes the operation of the geolocation database 10 from a perspective of data flow according to the state of the art.

The geolocation database 10 derives its decisions on the availability of white space spectrum for use by white space devices 15 from a model consisting of at least a radio propagation model, a terrain model for the geographical area served, and a database of incumbent spectrum users and their RF transmission characteristics (such as antennae directionality, transmit power, transmitter elevation and similar). In addition, knowledge (or at least assumptions) about the RF receiver characteristics (such as receiver sensitivity and thresholds for harmful interference) associated with incumbent spectrum users (often denoted as "victim devices") is considered by the decision rules implemented in a geolocation database 10. The RF environment model jointly derived from these parameters virtually constitutes an RF environment map as depicted in FIG. 3 for the area served and is repeatedly deployed to the database 10 ensuring consideration of short-term changes in incumbent location and characteristics, and for temporary incumbents (such as PMSE devices in the TV white space spectrum) in particular.

Potentially, white space devices 15 are considered by the database model while registering their presence and white space spectrum use characteristics with the geolocation database 10. This allows to compute (i.e., estimate) the accumulated interference generated by a multitude of white space devices 15 utilizing the same portion of white space spectrum simultaneously, and in consequence allows to adjust estimated interference thresholds in the model computation of the geolocation database 10.

When registering with the geolocation database 10, a white space device 15 provides a set of parameters describing its intended mode of operation (e.g., nomadic or fixed, low or high-power RF, RF operating frequencies and bandwidth range, geographical position, operating entity address, and similar). The extent of this parameter set is subject to regulatory constraints set forth in the operating license of the white space device 15 and its compliance to the policies of operation, which must be ensured by the device manufacturer. The geolocation database 10 then grants a lease for a certain white space spectrum range if available for the geographical area of operation (i.e. the coverage of RF transmitter of the white space device).

Realizations of white space devices 15 according to the state of the art may include spectrum sensing capacity, often used for internal operation, or enhancements of operation, of the white space device. A white space device with spectrum sensing capabilities 16 thus is considered state of the art although it is utilized in a way beyond state of the art by this invention. Often white space devices with spectrum sensing capabilities 16 are not able to operate as a white space device 15 and as a sensor 14 at the same time due to hardware restrictions. Units 17 and 18 hence denote those specific representations. In consequence realizations of a white space device 15 with spectrum sensing capabilities 16 exist that re-configure from a white space device 17 to a sensor 18 for a certain period of time.

Figure 4:
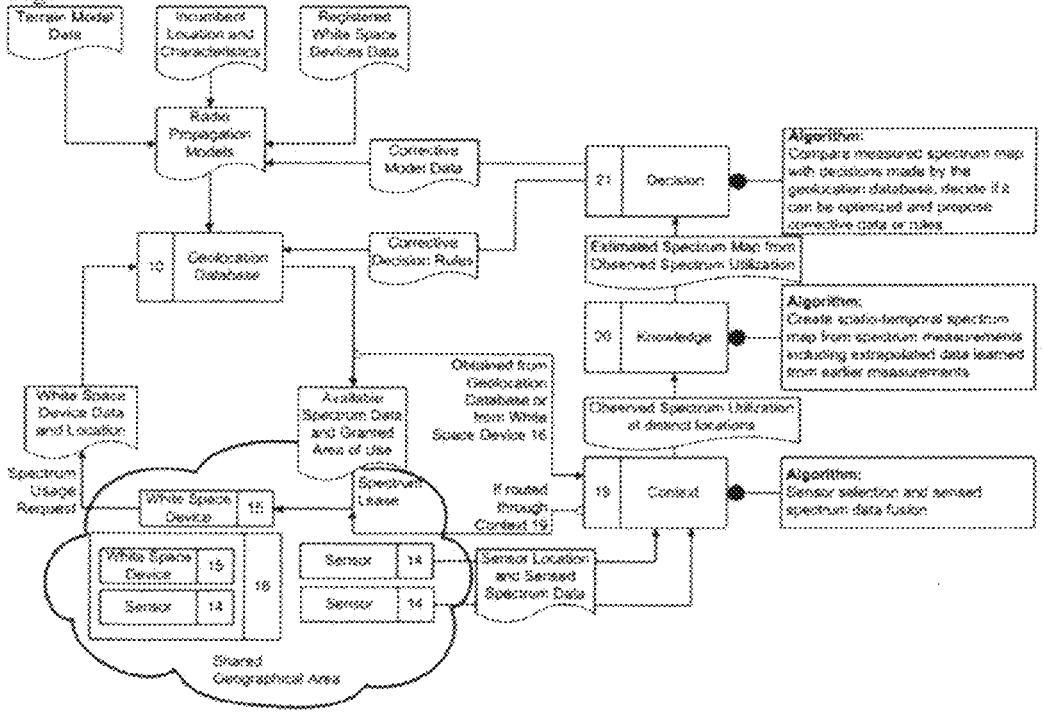
FIG. 4 shows relevant parts of the data flow through a geolocation database enhanced by the proposed method.

FIG. 4 describes the operation of an embodiment of the invention from a data flow perspective. Since the invention is intended to operate as an enhancement for geolocation databases 10 and white space devices 15 according to the state-of-the-art, reference to FIG. 2 can be made.

White space spectrum sensors 14 or white space devices 15 with sensing capabilities 16 (respectively their realization 18) are providing spectrum utilization data and forward this data to the context unit 19. If data about the location and spectrum usage characteristics of white space devices 15 is available to the context unit 19, white space spectrum sensors 14 can be selected from the vicinity of the white space device 15 (preferably from the close vicinity and from the RF coverage area boundaries) to reduce irrelevant measurements. The data required is usually included in the spectrum usage grants forwarded from the geolocation database towards the requesting white space device. Hence, the more knowledge about requests and grants exchanged between geolocation database 10 and white space device 15 is available to the context unit 19, the more efficient reduction of irrelevancy and redundancy in spectrum measurements can be made. The optimum case is that the context unit 19 is integrated with a white space device with sensing capabilities 16.

One of the main objectives of the context unit 19 is in the creation of supporting measurements from the locations of white space devices that can be utilized to create a spatio-temporal spectrum utilization map by the knowledge unit 20. In contrast the RF environment map virtually present in the geolocation database, the spectrum utilization map is evaluated from real measurements obtained from a multitude of sensors, preferably from those locations where white space devices are situated or have been in the near past. A limitation of the spectrum utilization map is in the fact that it can in principle only provide partial data (depending on the spatial density of sensors deployed and their sensing capabilities) compared to the model-based RF environment map. Hence, the decision unit 21 has to compare spatially overlapping areas of two spectrum utilization maps at those locations occupied by white space devices.

In the embodiment given by FIG. 4 the result of this comparison is used to create adjustment parameters. This embodiment has been chosen here since it can be realized with minimum data obtained from the database. Adjustment parameters can be deployed either to the radio propagation model by, for example, stating that a decision of the database cannot be acknowledged by measurements (logical decision) or to the decision rules inside of a geolocation database 10 (quantitative deviation from optimum).

To realize a logical decision an observation that a grant to use spectrum is given although an incumbent is sensed above threshold at the location of the requesting white space device, or spectrum use is denied although no incumbent is sensed at the location and in the vicinity of the requesting white space device is sufficient. This data than can be utilized to adjust model parameters (e.g., the path loss parameter).

The more data is available from the geolocation database 10, the more meaningful such comparisons can be made. In case the geolocation database 10 provides a local spectrum map to a requesting white space device, a detailed comparison of availability of spectrum (from model) and spectrum utilization (from measurement) can be provided for overlapping geographical areas. The benefit is in the fact that measurements include all devices that currently utilize the sensed spectrum (the model only includes registered incumbents) including malicious or defective devices as well as environmental effects (see "environmental diodes" or "rusty bolt effect" for such type of parasitic emission of RF spectrum). The corrective data made available to the model or to the geolocation database's decision logic then may be utilized more specific to target a certain optimization goal, such as conveying the data "decrease interference thresholds for area X by Y dB to counter accumulated interference by a large number of license-exempt spectrum users situate in area Z" from the decision unit to the database (or its operator).

The invention claimed is:

1. A method for the operation of a geolocation database comprising a spatio-temporal spectrum map comprising of white space spectrum occupancy and/or white space spectrum underutilization data, wherein
   a) at least one white space spectrum sensor takes measurement data remote from the geolocation database,
   b) the measurement data are transmitted to the geolocation database,
   c) the spatio-temporal spectrum map and/or its parameters and/or decisions based on this spectrum map are modified in dependence of the measurement data received by the geolocation database,
   d) and for replies transmitted to at least one white space device of the geolocation database in response to the request of the at least one white space device to register as a secondary spectrum user for a given geographical position, geographical area and given method of spectrum usage, complementary to the method applied by the geolocation database in order to estimate the potential interference caused by the white space device to incumbent spectrum users, further comprising the steps of:
e) detecting signal parameters of incumbent spectrum users by means of the at least one white space spectrum sensor,
f) transmitting spectrum measurements to at least one context unit for evaluation, classification and augmentation of detected signals originating from at least one white space spectrum sensor,
g) transmitting evaluated spectrum measurements from the at least one context unit to at least one knowledge unit for creating data about spatio-temporal spectrum utilization by recording, estimating, learning, or predicting spectrum measurements from a multitude of geographically distributed white space spectrum sensors, and
h) incorporating evaluated spectrum measurement data about spatio-temporal spectrum utilization into the geolocation database by means of refining and/or recommending refinements of decision thresholds and/or model parameters used to create and/or modify a model based spatio-temporal spectrum map and/or its parameters, which are used by the geolocation database to estimate potential interference.

2. The method according to claim 1, wherein the at least one white space spectrum sensor is coupled to at least one white space device.

3. The method according to claim 1, wherein the at least one white space spectrum sensor and/or the at least one white space device are movable devices, in particular handheld device.

4. The method of according to claim 1, further comprising the steps of:
transmitting the evaluated spectrum measurement data about spatio-temporal spectrum utilization to a decision-making unit for identification of geolocation database optimization opportunities by comparing a spectrum map resulting from spectrum measurements with present geolocation database decisions; and
automated processing of data obtained from the decision-making unit and from the geolocation database to jointly enhance the method to take decisions realized by the geolocation database.

5. The method according to claim 1, further comprising the steps of:
transmitting the evaluated spectrum measurement data about spatio-temporal spectrum utilization to a decision-making unit for identification of geolocation database optimization opportunities by comparing a spectrum map resulting from spectrum measurements with present geolocation database decisions; and
presenting recommendations to a database operator on how the method to take decisions realized by the geolocation database should be modified to enhance accuracy of decisions taken by the geolocation database.

6. The method according to claim 1, further comprising the steps of:
transmitting the evaluated spectrum measurement data about spatio-temporal spectrum utilization from a knowledge unit to a decision-making unit for identification of geolocation database optimization opportunities by comparing a spectrum map resulting from spectrum measurements with present geolocation database decisions; and
transmitting selected data from a decision-making unit to the geolocation database for recording and using this data in its implementation of internal methods for taking decisions in a complementary way; and/or
transmitting data about spectrum utilization jointly created from data stored in the database and data obtained from the knowledge unit and a decision-making unit to a user for further utilization.

7. The method according to claim 1, wherein a client of a geolocation database is a white space device intended to operate as a secondary spectrum user in spectrum white space capable to register its capabilities and characteristics of spectrum access (i.e., method and parameters) with the geolocation database.

8. The method according to claim 1, wherein a client of a geolocation database is a wireless communication device intended to operate as a secondary spectrum user in spectrum white space, in particular comprising a white space device, and at least one white space spectrum sensor, capable to register its capabilities and characteristics of spectrum access (i.e., method and parameters) with the geolocation database and in addition capable to act as a sensor for submitting spectrum measurements to the geolocation database or to the context unit.

9. The method according to claim 1, wherein a client of a geolocation database is a wire line or wireless device intended to operate as a white space spectrum sensor but not as a white space device, capable to register with a geolocation database for acting as a sensor submitting spectrum measurements to the geolocation database or to the context unit.

10. The method according to claim 1, wherein the data about spatio-temporal spectrum utilization is utilized by a decision unit to enhance accurateness of the mathematical and simulative models that have been used to determine the method of taking decisions by the geolocation database or to recommend such enhancements to the geolocation database.

11. The method according to claim 1, wherein the data about spatio-temporal spectrum utilization as described by the spectrum map is utilized by a decision unit to enhance protection of incumbent spectrum users that might be affected by inaccurate decisions taken by the geolocation database or to recommend such enhancements to the geolocation database.

12. The method according to claim 1, wherein the data about spatio-temporal spectrum utilization as described by the spectrum map is utilized by a decision unit to enlarge the amount of spectrum that can be granted to secondary spectrum users in the spatial or temporal domain without significantly increasing the risk of interference with incumbent spectrum users or to recommend such enhancements to the geolocation database.

13. The method according to claim 1, wherein spectrum sensing includes taking measurements about neighboring secondary spectrum users in addition to those taken about observing incumbent spectrum users.

14. The method according to claim 1, wherein the user utilizes the data obtained from the database in a business process, in particular in spectrum trading or brokerage such as granting temporary spectrum usage rights to its clients by e.g. requesting a client to initiate a registration request as a white space device to a geolocation database.

15. The method according to claim 1, wherein spectrum sensing includes measurement data from at least one white space spectrum sensor geographically or topologically neighboring a client in order to construct a local spatio-temporal spectrum map or to increase accuracy and/or relevance of an already obtained spectrum map.

16. The method according to claim 1, wherein spectrum sensing includes measurements about geographically or topologically neighboring secondary spectrum users to obtain observations about the spectrum usage characteristics of other clients of the geolocation database.

17. The method according to claim 1, wherein spectrum sensing includes measurements made by mobile sensors.

18. The method according to claim 1, wherein a knowledge unit obtains spectrum utilization data from a geolocation database in addition to evaluated spectrum measurements from at least one context unit to generate data about spatio-temporal spectrum utilization.

19. The method according to claim 1, wherein a knowledge unit obtains spectrum utilization data from multiple geolocation databases, possibly communicating independently from the method described herein, in addition to evaluated spectrum measurements from at least one context unit to generate data about spatio-temporal spectrum utilization.

20. A geolocation database system designed for applying the method according to claim 1, wherein a geolocation database is coupled to
- at least one white space spectrum sensor taking measurements remote from the geolocation database and the geolocation database receives the measurement data so that a spatio-temporal spectrum map and/or its parameters of the geolocation database is modifiable in dependence of the measurements received.

* * * * *